United States Patent
Ghosh et al.

(10) Patent No.: US 7,251,127 B2
(45) Date of Patent: *Jul. 31, 2007

(54) CONVERTIBLE AND DETACHABLE LAPTOPS

(75) Inventors: Prosenjit Ghosh, Portland, OR (US); Shreekant Suryakant Thakkar, Portland, OR (US); Truong V. Phan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 10/790,853

(22) Filed: Mar. 2, 2004

(65) Prior Publication Data

US 2004/0169995 A1 Sep. 2, 2004

Related U.S. Application Data

(62) Division of application No. 10/367,378, filed on Feb. 14, 2003, now Pat. No. 6,775,129.

(51) Int. Cl.
*H05K 5/00* (2006.01)

(52) U.S. Cl. .................. 361/683; 708/100; 455/90

(58) Field of Classification Search ........ 361/674–687, 361/724–727; 455/90; 415/115; 312/223.1–223.6; 345/156; 248/685
See application file for complete search history.

(56) References Cited

U.S. PATENT DOCUMENTS

| | | | |
|---|---|---|---|
| 5,085,394 A | 2/1992 | Torii | |
| 5,200,913 A | 4/1993 | Hawkins et al. | |
| 5,255,214 A | 10/1993 | Ma | |
| 5,267,123 A | 11/1993 | Boothroyd et al. | |
| 5,297,003 A | 3/1994 | Nomura et al. | |
| 5,321,420 A * | 6/1994 | Rezek et al. | 345/440.1 |
| 5,552,957 A | 9/1996 | Brown et al. | |
| 5,819,162 A | 10/1998 | Spann et al. | |
| 5,847,924 A * | 12/1998 | Youn | 361/686 |
| 6,049,813 A | 4/2000 | Danielson et al. | |
| 6,097,595 A * | 8/2000 | Cipolla | 361/687 |
| 6,429,846 B2 * | 8/2002 | Rosenberg et al. | 345/156 |
| 6,483,698 B1 | 11/2002 | Loh | |
| 6,665,550 B1 * | 12/2003 | Muller | 455/575.1 |
| 6,761,421 B2 * | 7/2004 | Chen et al. | 312/223.2 |
| 6,775,129 B1 * | 8/2004 | Ghosh et al. | 361/683 |
| 6,778,196 B2 | 8/2004 | Nakamura | |
| 6,780,019 B1 | 8/2004 | Ghosh et al. | |
| 6,825,415 B1 | 11/2004 | Chen et al. | |
| 6,829,140 B2 * | 12/2004 | Shimano et al. | 361/683 |
| 6,840,791 B2 | 1/2005 | Hsiu | |
| 2003/0021085 A1 | 1/2003 | Landry et al. | |
| 2003/0142469 A1 | 7/2003 | Ponx | |
| 2004/0155861 A1 * | 8/2004 | Jackson, III | 345/156 |

OTHER PUBLICATIONS

International Search Report, Jul. 22, 2004, 1 page.

* cited by examiner

*Primary Examiner*—Hung Van Duong
(74) *Attorney, Agent, or Firm*—Blakely, Sokoloff, Taylor & Zafman LLP

(57) ABSTRACT

According to one embodiment of the present invention, a method of converting a computer from a folded position into an alternate position is disclosed. The method includes: providing a display; providing a base coupled to the display; providing a base flap pivotally attached to the display and the base, the base flap being attached to the display at a distance sufficiently away from edges of the display to provide a reduced volumetric size of the computer in a laptop position.

43 Claims, 7 Drawing Sheets

CONVERTIBLE AND DETACHABLE LAPTOPS

CROSS REFERENCE TO RELATED APPLICATIONS

This application is a divisional of U.S. patent application Ser. No. 10/367,378, filed on Feb. 14, 2003 now U.S. pat. No. 6,775,129.

FIELD OF THE INVENTION

The present invention generally relates to the field of computer systems. More particularly, an embodiment of the present invention provides methods and apparatus related to convertible and/or detachable laptops.

BACKGROUND

Notebook (also called laptop) computers are lightweight personal computers, which are quickly gaining popularity. The popularity of the notebook computers has especially increased since their prices have been dropping significantly, while maintaining similar performance as their larger siblings (i.e., desktop computers or workstations).

One clear advantage of notebook computers is their ease of portability. The lighter weight and increased battery life has made the use of notebook computers more commonplace. Aside from size, a major difference between notebook computers and personal computers is the graphical display system. Notebook computer designers employ a variety of techniques to produce lightweight graphical display systems.

FIG. 1 shows a typical notebook computer in accordance with the prior art. A notebook computer 100 typically includes a liquid crystal display (LCD) 102 for displaying graphical images and a base unit 104 for encasing different hardware elements of the notebook computer. The hardware elements include a keyboard 106, a battery 108, a hard drive (not shown), and a central processing unit (CPU, not shown).

In some applications, the notebook computers may be utilized as a tablet (also called a convertible laptop), i.e., where a user may input data by inputting it directly onto the LCD 102. Some users, however, dislike tablet computers because their usage requires a different approach (e.g., using a pen instead of a pointing stick). Additionally, the current convertible laptops use their own proprietary or nonstandard operating systems (OSes). The nonstandard implementation of the convertible laptops creates compatibility issues with other computer systems in use at the user's home or office.

The wider use of notebook computers has also created problems for their users, including physical ones. Incidents of carpal tunnel syndrome, eyestrain, and backache are on the rise. For example, increased passenger capacity in airplanes has resulted in reduced leg and shoulder room, in turn, increasing the stress on laptop users' posture when utilizing their computers. For example, with respect to FIG. 1, users often rest their palms on the hand rest area of the keyboard (210) while typing on the keyboard 106, which increases the stress on the user's hands. Similarly, user eyestrain may result when the LCD panel 102 cannot be tilted back far enough (e.g., due to space restrictions), thereby rendering a less than ideal brightness yield from the incorrectly angled LCD panel.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
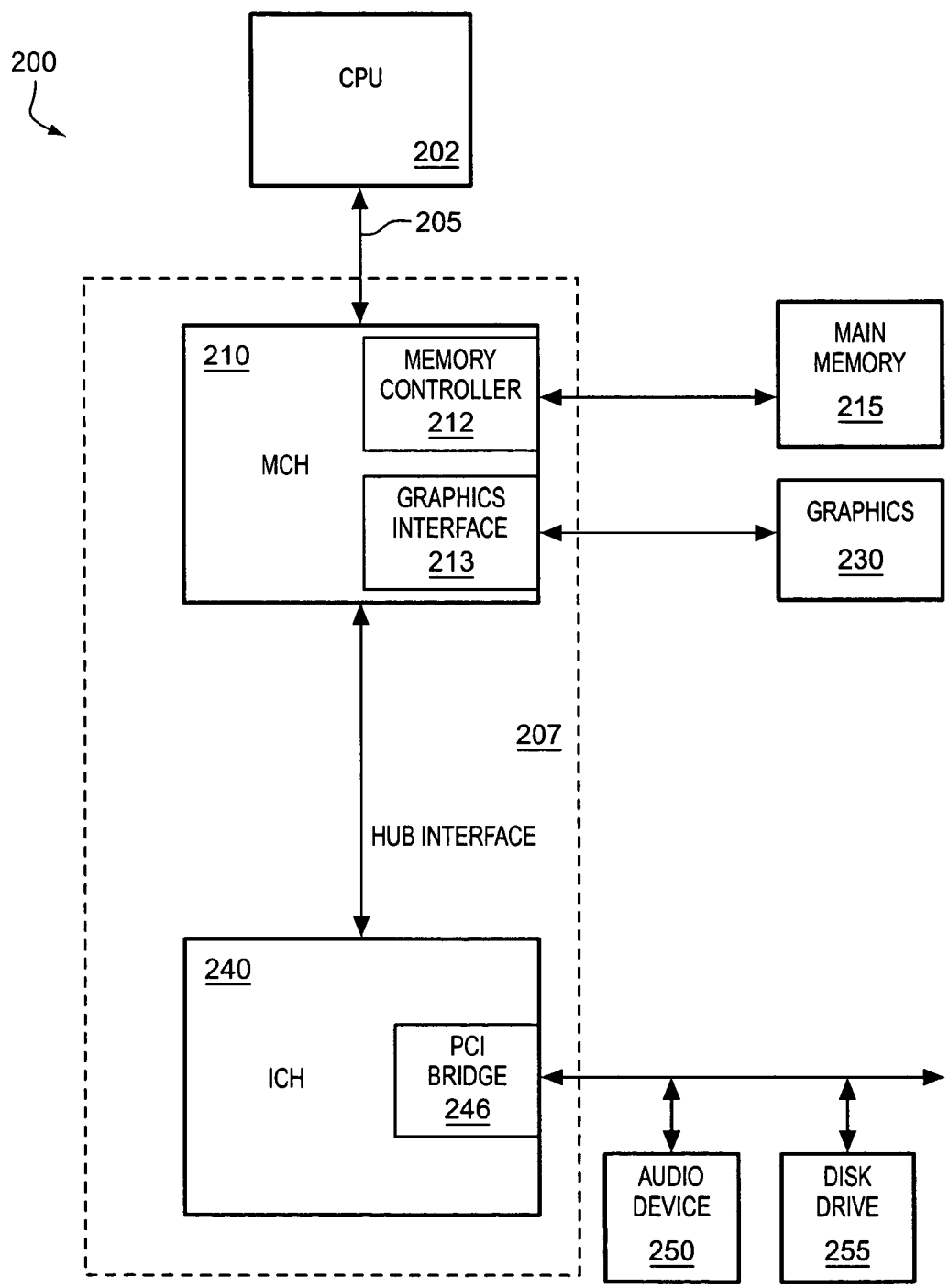
FIG. 2 illustrates an exemplary block diagram of a computer system 200 in accordance with an embodiment of the present invention.

FIG. 2 illustrates an exemplary block diagram of a computer system 200 in accordance with an embodiment of the present invention. The computer system 200 includes a central processing unit (CPU) 202 coupled to a bus 205. In one embodiment, the CPU 202 is a processor in the Pentium® family of processors including the Pentium® II processor family, Pentium® III processors, Pentium® IV processors available from Intel Corporation of Santa Clara, Calif. Alternatively, other CPUs may be used, such as Intel's XScale processor, Intel's Banias Processors, ARM processors available from ARM Ltd. of Cambridge, the United Kingdom, or OMAP processor (an enhanced ARM-based processor) available from Texas Instruments, Inc., of Dallas, Tex.

A chipset 207 is also coupled to the bus 205. The chipset 207 includes a memory control hub (MCH) 210. The MCH 210 may include a memory controller 212 that is coupled to a main system memory 215. Main system memory 215 stores data and sequences of instructions that are executed by the CPU 202 or any other device included in the system 200. In one embodiment, main system memory 215 includes dynamic random access memory (DRAM); however, main system memory 215 may be implemented using other memory types. Additional devices may also be coupled to the bus 205, such as multiple CPUs and/or multiple system memories.

The MCH 210 may also include a graphics interface 213 coupled to a graphics accelerator 230. In one embodiment, graphics interface 213 is coupled to graphics accelerator 230 via an accelerated graphics port (AGP) that operates according to an AGP Specification Revision 2.0 interface developed by Intel Corporation of Santa Clara, Calif.

In addition, the hub interface couples the MCH 210 to an input/output control hub (ICH) 240 via a hub interface. The ICH 240 provides an interface to input/output (I/O) devices within the computer system 200. The ICH 240 may be coupled to a Peripheral Component Interconnect (PCI) bus adhering to a Specification Revision 2.1 bus developed by the PCI Special Interest Group of Portland, Oreg. Thus, the ICH 240 includes a PCI bridge 246 that provides an interface to a PCI bus 242. The PCI bridge 246 provides a data path between the CPU 202 and peripheral devices.

The PCI bus 242 includes an audio device 250 and a disk drive 255. However, one of ordinary skill in the art will appreciate that other devices may be coupled to the PCI bus 242. In addition, one of ordinary skill in the art will recognize that the CPU 202 and MCH 210 could be combined to form a single chip. Furthermore, graphics accelerator 230 may be included within MCH 210 in other embodiments.

In addition, other peripherals may also be coupled to the ICH 240 in various embodiments. For example, such peripherals may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, the computer system 200 is envisioned to receive electrical power from one or more of the following sources for its operation: a battery, alternating current (AC) outlet (e.g., through a transformer and/or adaptor), automotive power supplies, airplane power supplies, and the like.

Figure 3:
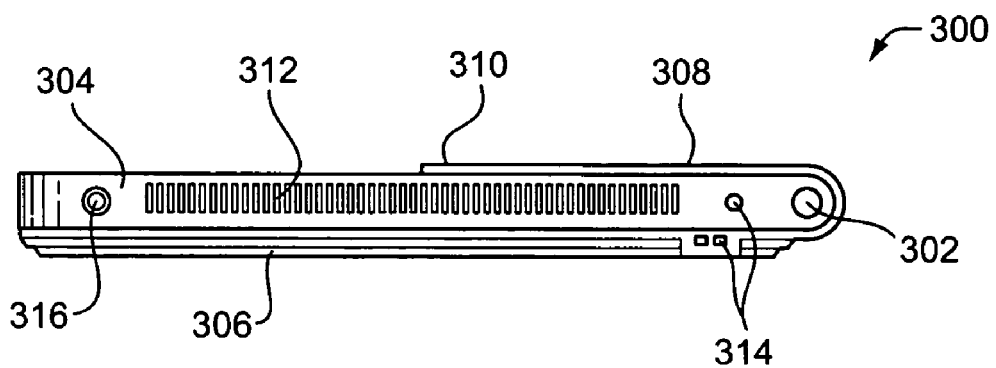
FIG. 3 illustrates an exemplary side view of a computer system 300 in accordance with an embodiment of the present invention.

FIG. 3 illustrates an exemplary side view of a computer system 300 in accordance with an embodiment of the present invention. In an embodiment of the present invention, the computer system 300 may be similar to or identical to the computer systems discussed with respect to the figures herein. In one embodiment, the computer system 300 may be a laptop (also known as a notebook) computer, which may be converted to a tablet computer (i.e., a convertible laptop).

Figure 1:
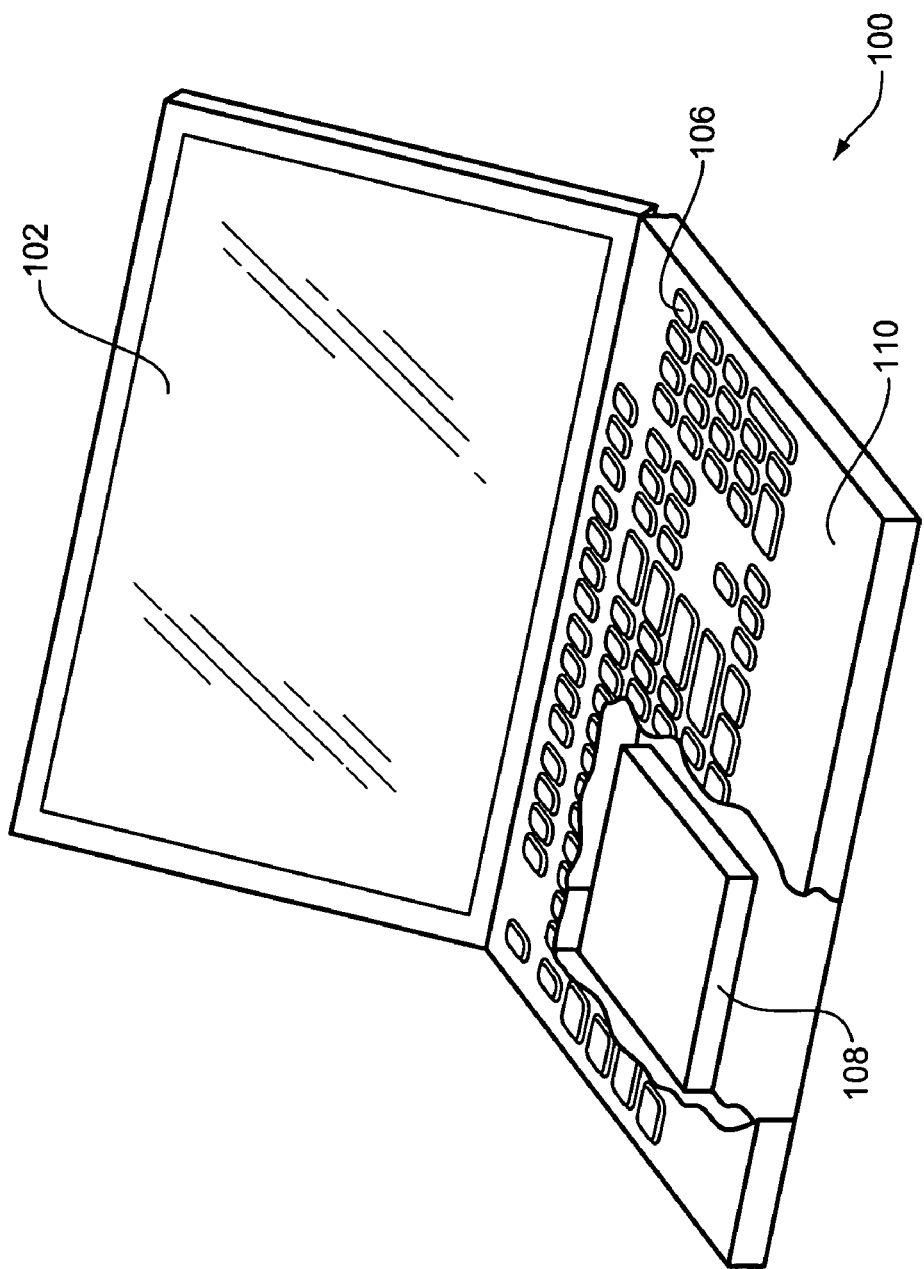
FIG. 1 is a prior art depiction of a notebook computer.

The computer system 300 includes a pen receptacle 302 (e.g., to receive a pen for the tablet embodiment), a display 304 (which may also be used as a tablet), a base 306, and a base flap 308. In one embodiment of the present invention, the pen receptacle 302 may be embedded in the display 304. In another embodiment of the present invention, the display unit 304 may be an LCD, plasma display, and the like. In a further embodiment of the present invention, the display unit may include hardware elements such as a CPU, peripherals, interfaces, chipsets, and the like (such as those discussed with respect to FIG. 1). In yet another embodiment of the present invention, the base 306 houses hardware devices such as batteries, storage devices, communication ports, a keyboard, and the like.

The base flap 308 may be wrapped around the tablet 304 and attached to it by a latch 310. In an embodiment of the present invention, the latch 310 permits the base flap 308 to pivotally rotate against the base 306 (e.g., utilizing a hinge, screw, pin, and other like fasteners). The base flap 308 may be constructed with material such as leather, plastic, fabric, metal, flexible cable, and the like. In an embodiment of the present invention, the base flap 308 may have one or more embedded and/or surface-attached solid and/or semi-solid structures (e.g., at select locations) to provide structural rigidity sufficient to support the tablet 304 and/or other components provided within the base flap 308 while being able to wrap around the tablet 304 (as illustrated in FIG. 3).

The tablet 304 further includes openings 312 to permit airflow for cooling purposes. The base 306 may include a keyboard as will be discussed with respect to for example FIG. 7. Both the tablet 304 and the base 306 may include additional connections 314 for attachment of external devices such as ear phones, microphones, speakers, communication devices, AC adaptors, and the like. The tablet 304 may further include a locking tap 316 (e.g., to engage/disengage the base 306 from the tablet 304).

Figure 4:
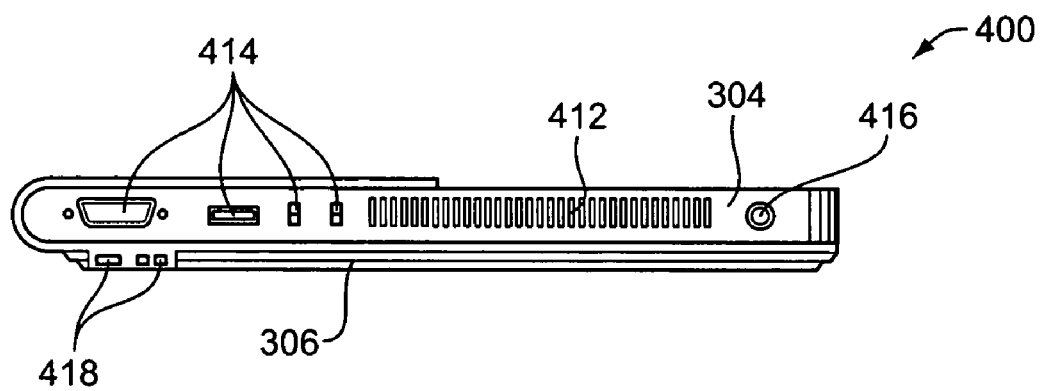
FIG. 4 illustrates an exemplary side view of a computer system 400 in accordance with an embodiment of the present invention.

FIG. 4 illustrates an exemplary side view of a computer system 400 in accordance with an embodiment of the present invention. In an embodiment of the present invention, the side view illustrated may of an opposite side of the computer system 300 of FIG. 3. In a further embodiment of the present invention, the computer system 400 may be similar to or identical to the computer systems discussed with respect to the figures herein.

The computer system 400 includes the tablet 304, the base 306, openings 412 (e.g., to permit airflow to cool the computer system 400), a locking tap 416 (e.g., to engage/disengage the base 306 from the tablet 304), connectors 414 (e.g., to provide communication facilities for external peripherals such as expansion ports, microphones, speakers, earphones, and the like), port(s) 418 (e.g., USB ports or its varieties such as USB2.0), and controls (e.g., to control volume, brightness of the display, and the like (not shown)).

Figure 5:
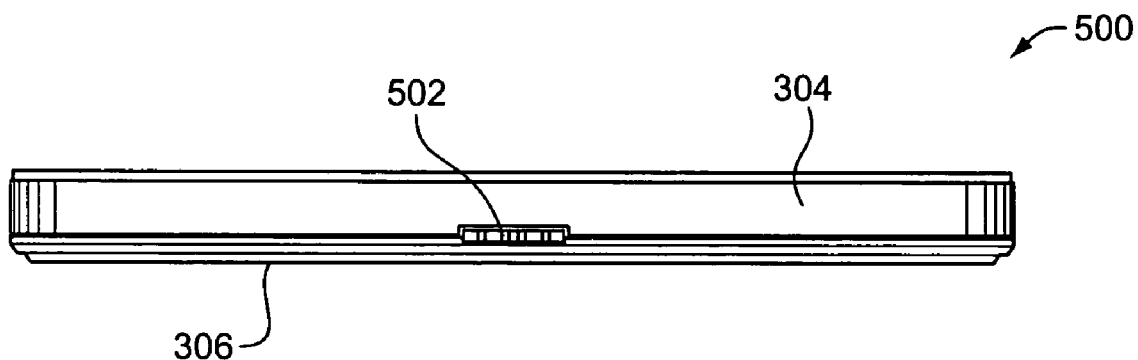
FIG. 5 illustrates an exemplary front, side view of a computer system 500 in accordance with an embodiment of the present invention.

FIG. 5 illustrates an exemplary front, side view of a computer system 500 in accordance with an embodiment of the present invention. In an embodiment of the present invention, the computer system 500 may be similar to or identical to the computer systems discussed with respect to the figures herein. The computer system 500 includes the base 306, the tablet 304, and indicators 502. The indicators 502 may illustrate one or more of the following: battery power remaining, hard drive access, floppy access, power mode (e.g., on or off), suspend mode, and the like.

Figure 6:
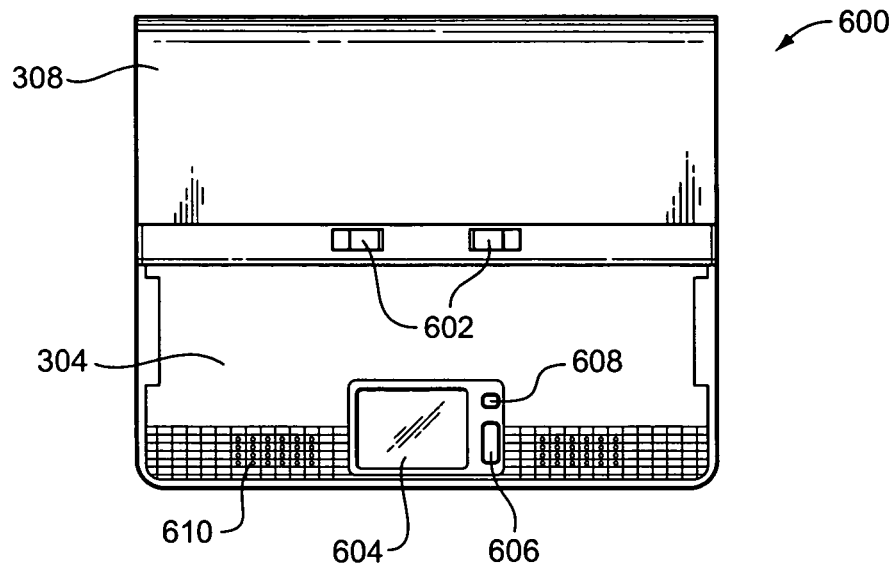
FIG. 6 illustrates an exemplary top view of a folded computer system 600 in accordance with an embodiment of the present invention.

FIG. 6 illustrates an exemplary top view of a folded computer system 600 in accordance with an embodiment of the present invention. In an embodiment of the present invention, the computer system 600 may be similar to or identical to the computer systems discussed with respect to the figures herein. The computer system 600 includes one or more latches 602 to engage/disengage the base flap 308 from the tablet 304.

The computer system 600 further includes a display 604, a scroll contact 606 with one or more functions (e.g., for scrolling up or down and selecting), and a return button 608 (e.g., for navigating backwards). In an embodiment of the present invention, the display 604 may be an always-on display to provide information to a user. The display 604 may be an LCD. The display 604 may also receive input data directly (for example, by on-screen writing). In accordance with one embodiment of the present invention, the display 604 is envisioned to provide data to a user while the computer system 600 is in a folded position, e.g., for faster access to data without having to unfold the computer system 600. Additionally, the use of the display 604 in place of the tablet 304 may provide reduced power consumption, thereby extending the battery life of the computer system 600. The computer system 600 may further include a speaker portion 610 to provide sound signals.

Figure 7:
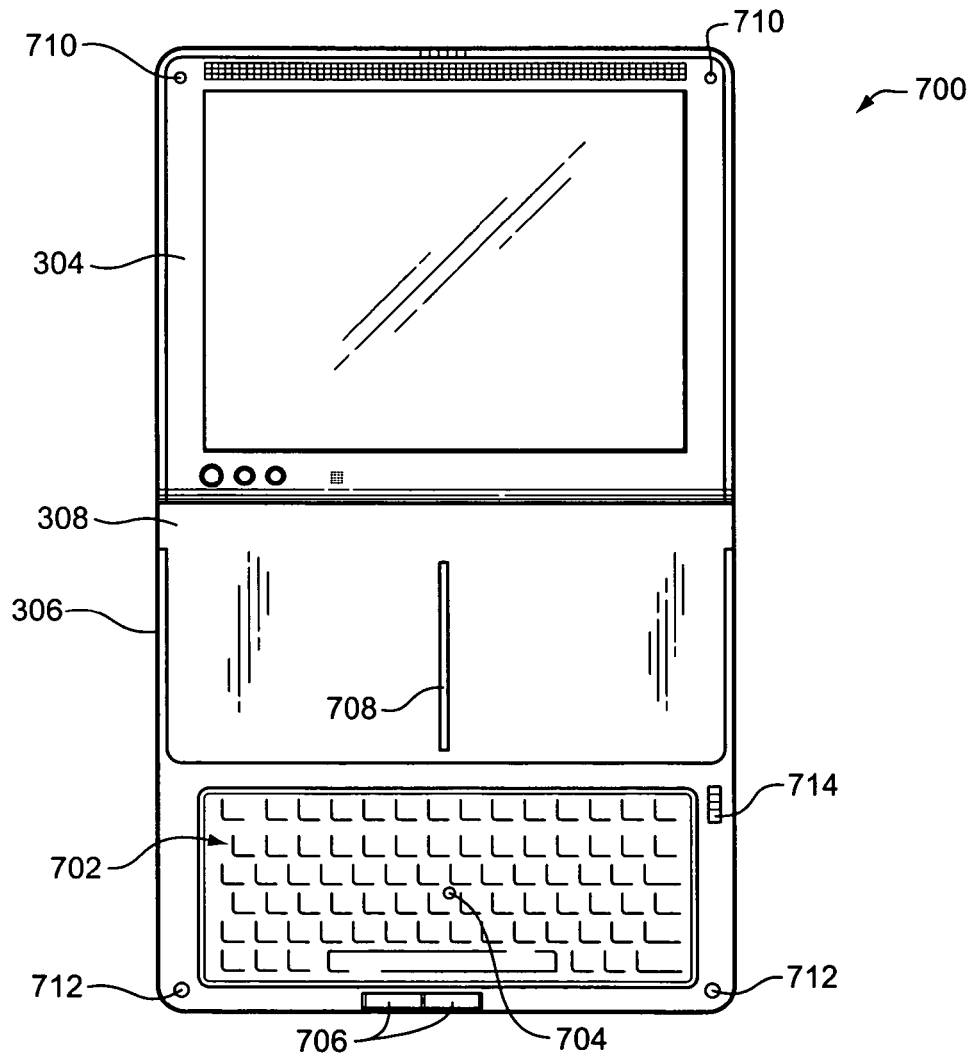
FIG. 7 illustrates an exemplary top view of an unfolded computer system 700 in accordance with an embodiment of the present invention.

FIG. 7 illustrates an exemplary top view of an unfolded computer system 700 in accordance with an embodiment of the present invention. In an embodiment of the present invention, the computer system 700 may be similar to or identical to the computer systems discussed with respect to the figures herein. The computer system 700 includes a keyboard 702 mounted in the base 306, a pointing stick 704 (e.g., to navigate), one or more selection buttons 706 (e.g., to use for right-click/left-click functionality, or otherwise configurable for automating other tasks), one or more alignment tabs 710 in the tablet 304, and one or more alignment tabs 712 in the base 306 (to match up with the tablet alignment tabs 710). In an embodiment of the present invention, the base alignment tabs 712 and the tablet alignment tabs 710 may be complementary (i.e., dimples versus extrusions) to provide proper alignment of the tablet 304 and the base 306 in a folded position such as shown in the FIG. 6.

The computer system 700 further includes a guiding/locking mechanism 708 for engaging/disengaging the tablet 304 as it is adjusted against the base 306. As illustrated the computer system 700 includes the base flap 308 and indicators 714 (e.g., embedded in the base 306). The indicators 714 may illustrate one or more of the following: battery power remaining, hard drive access, floppy access, power mode (e.g., on or off), suspend mode, and the like.

Figure 8:
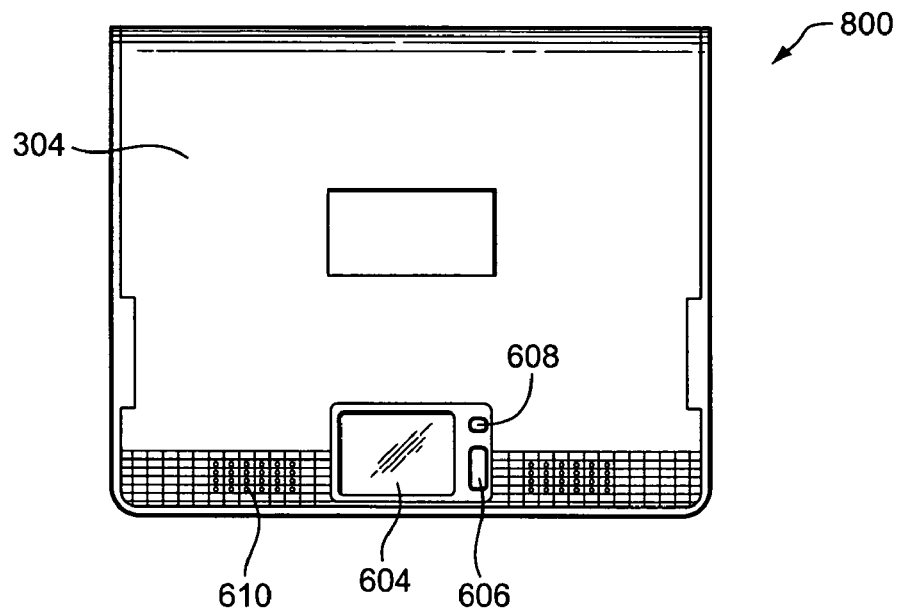
FIG. 8 illustrates an exemplary top view of a computer system 800 in accordance with an embodiment of the present invention.

FIG. 8 illustrates an exemplary top view of a computer system 800 in accordance with an embodiment of the present invention. In an embodiment of the present invention, the computer system 800 may be similar to or identical to the computer systems discussed with respect to the figures herein. In a further embodiment of the present invention, the computer system 800 is the same as the computer system 600 of FIG. 6 with the base flap 308 detached from the tablet 304. The computer system 800 includes the display 604, the scroll contact 606, the return button 608, and the speaker portion 610.

Figure 9:
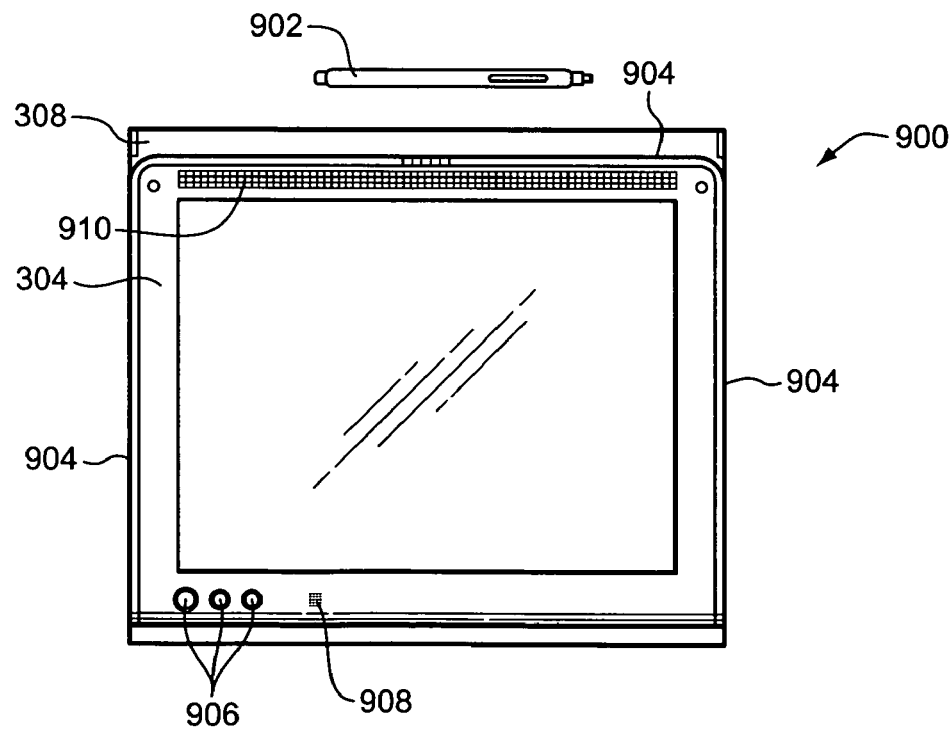
FIG. 9 illustrates an exemplary top view of a computer system 900 in accordance with an embodiment of the present invention.

FIG. 9 illustrates an exemplary top view of a computer system 900 in accordance with an embodiment of the present invention. In an embodiment of the present invention, the computer system 900 may be similar to or identical to the computer systems discussed with respect to the figures herein. In a further embodiment of the present invention, the computer system 900 illustrates the computer system 600 of FIG. 6 with the base flap 308 and the base 306 folded under the tablet 304. The computer system 900 includes a pen 902 for writing on the tablet 304. The pen 902 may be a battery-less pen such as pens provided by Wacom Company, Ltd., of Japan. In an embodiment of the present invention, the tablet 304 has a magnetic underlay, resistive underlay, and/or the like to receive signals input by the pen 902.

As illustrated in FIG. 9, in its folded position, the computer system 900 may have a portion of the base flap 308 protruding. The tablet 304 further includes a speaker portion 910 to provide sound signals, a microphone 908 to receive sound signals, one or more buttons 906 (e.g., power on/off button, security button (e.g., for safe mode operations which enable quick suspension or wake up of the computer system 900), and/or rotate button (e.g., to rotate the image displayed on the tablet 304 by a certain degree such as 90 or 180 degrees in clockwise or counter-clockwise directions)). Also illustrated in FIG. 9, are perimeter portions 904 of the tablet 304 which may embed (or cover) one or more types of wireless antennas for provision of global system for mobile communication (GSM), general packet radio service (GPRS), Bluetooth, institute of electrical and electronics engineers (IEEE) 802.11x, and the like.

Figure 10:
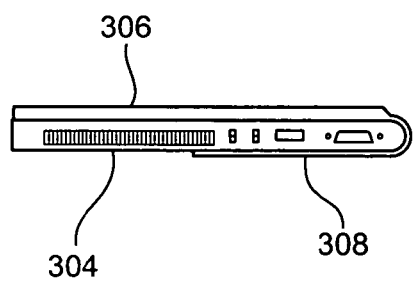
FIGS. 10 through 16 illustrate exemplary side views of computer systems in accordance with various embodiments of the present invention.
Figure 11:
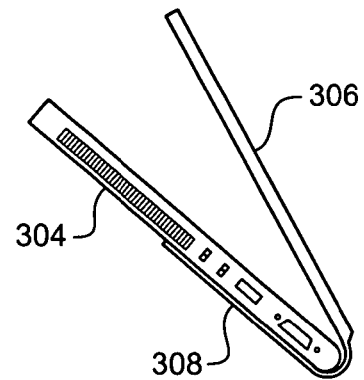
Figure 12:
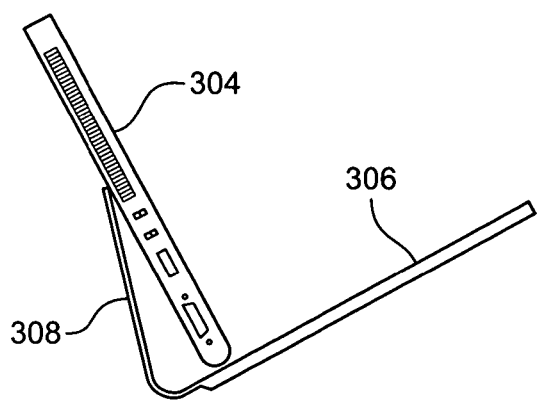

FIGS. 10 through 16 illustrate exemplary side views of computer systems in accordance with various embodiments of the present invention. In an embodiment of the present invention, the computer system shown in the FIGS. 10–16 may be similar to or identical to the computer systems discussed with respect to the other figures herein. FIG. 10 illustrates the side view of the computer system in a fully folded position. FIG. 11 illustrates the side view of the computer system as the base 306 and the tablet 304 are pulled apart from the fully folded position of FIG. 10. FIG. 12 illustrates the side view of the computer system as the base 306 and the tablet 304 are further pulled apart from the position shown in FIG. 11.

Figure 13:
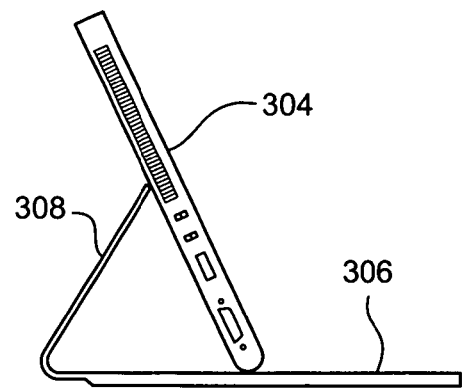

FIG. 13 illustrates the side view of the computer system in a laptop (or notebook) position. As shown in FIG. 13, the tablet 304 may rest on the base 306, with the base flap 308 providing support for the tablet 304. In one embodiment of the present invention, the tablet 304 may be locked in position (such as discussed with respect to FIG. 7). In an embodiment of the present invention, it is envisioned that the laptop position illustrated in FIG. 13 provides the laptop configuration in a relatively lower volumetric space (e.g., by reducing the amount of space required in the back of the laptop screen to achieve a screen angle required by a user in relatively tighter spaces while providing access to the keyboard and/or other input devices). In one embodiment of the present invention, the angle between the face side of the tablet 304 and the face side of the base 306 is between about 95 to 140 degrees when in the laptop position.

Figure 14:
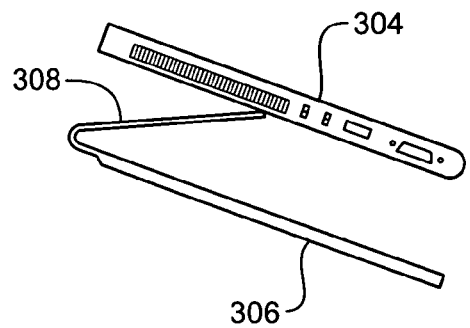
Figure 15:
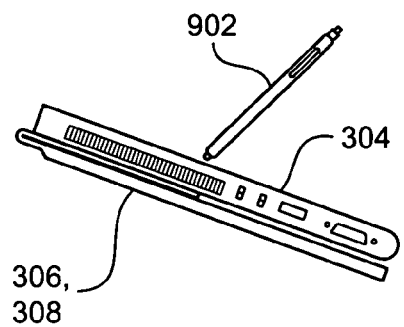

FIG. 14 illustrates the side view of the computer system as it is further folded into a tablet configuration. As shown in FIG. 14, the base flap 308 may be folded between the base 306 and the tablet 304. FIG. 15 illustrates the side view of the computer system in a tablet configuration with the pen 902 providing input data to the tablet 304. As shown in FIG. 15, in the tablet configuration, the base 306 and the base flap 308 provide support for the tablet 304.

Figure 16:
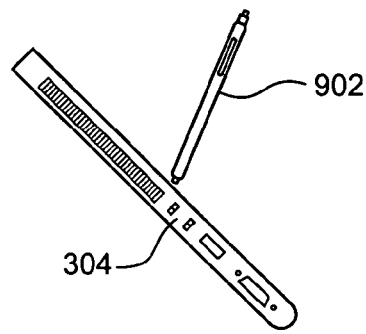

In an embodiment of the present invention, the base 306 is automatically deactivated once the computer system assumes its tablet configuration. Similarly, it is envisioned that the base 306 may be reactivated once the computer system leaves its tablet configuration. This approach may assist in eliminating input of stray data when the computer system is switching between a tablet and laptop configuration, for example. FIG. 16 illustrates the side view of the computer system in a tablet configuration with the base 306 and/or the base flap 308 detached (such as discussed with respect to latches 602 of FIG. 6).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
 a display housing comprising a display and a CPU;
 a base comprising a keyboard; and
 a base flap pivotally attached to the display housing and pivotally attached to the base so that the display housing may be oriented to rest on the base with the keyboard exposed for use with the display,
 wherein the base flap is removably attached to the display housing using a latch.

2. The computer system of claim 1 wherein the display housing further comprises connectors for external peripherals.

3. The computer system of claim 1, wherein the display housing further comprises controls to control speaker volume and display brightness.

4. The computer system of claim 1, wherein the display housing further comprises indicators for at least one of battery power remaining, hard drive access, and power mode.

5. The computer system of claim 1, wherein the display housing further comprises a speaker portion, a microphone and a power button.

6. The computer system of claim 1, wherein the display housing further comprises an embedded wireless antenna.

7. The computer system of claim 1, wherein the base further comprises communication ports.

8. The computer system of claim 1, wherein the base flap is attached so that it may be wrapped around the display housing.

9. The computer system of claim 1 wherein the latch permits the base flap to pivotally rotate against the base.

10. The computer system of claim 1, wherein the latch further comprises a locking tap to removably engage the base from the tablet.

11. The computer system of claim 1, wherein when the display housing is oriented to rest on the base, the base flap and the base fold under the display housing with a portion of the base flap protruding.

12. The computer system of claim 1, wherein the base may be oriented to cover the display, the computer system further comprising a second display accessible when the primary display is covered by the base.

13. The computer system of claim 12, wherein the second display is an always-on display to provide information to a user.

14. The computer system of claim 12, further comprising a scroll contact proximate the display for scrolling and selecting, the scroll contact being accessible when the primary display is covered by the base.

15. The computer system of claim 12, wherein the second display may receive input data directly by on-screen writing.

16. The computer system of claim 12, further comprising a speaker portion proximate the second display to provide sound signals.

17. A computer system comprising:
 a display housing including a tablet, the tablet having an underlay to receive signals input by a pen;
 a base to protect the tablet, the base including a keyboard; and
 a base flap to removably attach the base to the display housing.

18. The computer system of claim 17, wherein the base flap may be wrapped around the display housing.

19. The computer system of claim 17, wherein the base flap is removably attached to the display housing by a latch.

20. The computer system of claim 17, further comprising a mechanism to removably engage the display housing against the base.

21. The computer system of claim 17, wherein the display housing further comprises a locking tap to removably engage the base and the display housing.

22. The computer system of claim 17, wherein the base flap and the base may fold under the display housing with a portion of the base flap protruding.

23. The computer system of claim 17, wherein the display housing further comprises a pen receptacle to receive the pen.

24. The computer system of claim 17, wherein the display housing further comprises a CPU.

25. The computer system of claim 17, wherein the display housing further comprises connectors for external peripherals.

26. The computer system of claim 17, wherein the display housing further comprises a speaker portion, a microphone, and a power button.

27. The computer system of claim 17, wherein the tablet is on a first surface of the display housing, the computer system further comprising a second display on a second opposite surface of the display housing accessible when the base is protecting the tablet.

28. The computer system of claim 19, wherein the latch permits the base flap to pivotally rotate against the base.

29. The computer system of claim 27, further comprising a scroll contact proximate the second display for scrolling and selecting, the scroll contact being accessible when the tablet is covered by the base.

30. A computer system comprising:
 a display housing having a first surface having a first display and a second surface opposite the first surface having a second display; and
 a base pivotally attached to the display housing to alternately protect the first display in a closed position and expose the first display in an open position.

31. The computer system of claim 30, wherein the display housing further comprises a scroll contact for scrolling up or down and selecting using the second display.

32. The computer system of claim 30, wherein the display housing further comprises a return button for navigating backwards using the second display.

33. The computer system of claim 30, wherein the second display may also input data directly by on-screen writing.

34. The computer system of claim 30, wherein the second display operates while the computer system is in the folded position.

35. The computer system of claim 30, wherein the display housing further comprises a speaker portion for use with the second display.

36. The computer system of claim 30, wherein the display housing further comprises a CPU, peripherals, interfaces, and a chipset.

37. The computer system of claim 30, wherein the base further comprises a keyboard accessible in the open position.

38. The computer system of claim 30, wherein the base is removably attached to the display housing using a base flap.

39. A computer system comprising:
 a display housing comprising a display, a CPU, a chipset, connectors for external peripherals, a speaker portion, a microphone, a battery, an indicator for battery power remaining, controls to control speaker volume and display brightness, and a power button; and a base comprising a keyboard, wherein the base is removably attached to the display housing using a latch and wherein the base may be oriented to cover the display.

40. The computer system of claim 39, further comprising a base flap pivotally and removably attached to the display housing using the latch and pivotally attached to the base so that the display housing may be oriented to rest on the base with the keyboard exposed for use with the display.

41. The computer system of claim 39, wherein the display housing further comprises a tablet, the tablet having an underlay to receive signals input by a pen.

42. The computer system of claim 39, wherein the display housing may be locked to the base in a laptop position.

43. The computer system of claim 40, wherein the base flap may be folded between the base and the display housing to a tablet position exposing the display and covering the keyboard.

* * * * *